Jan. 17, 1967   A. J. TAYLOR   3,298,642
TREE STAND
Filed April 8, 1965
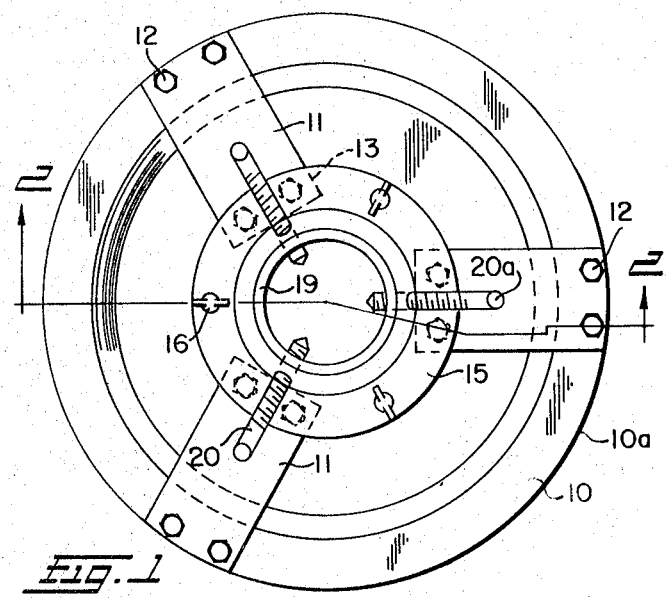
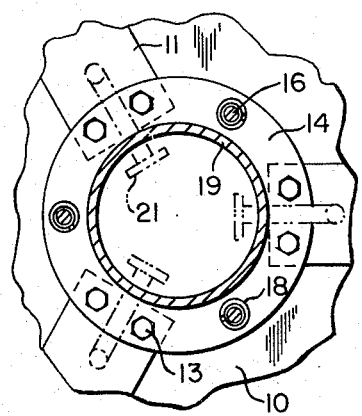
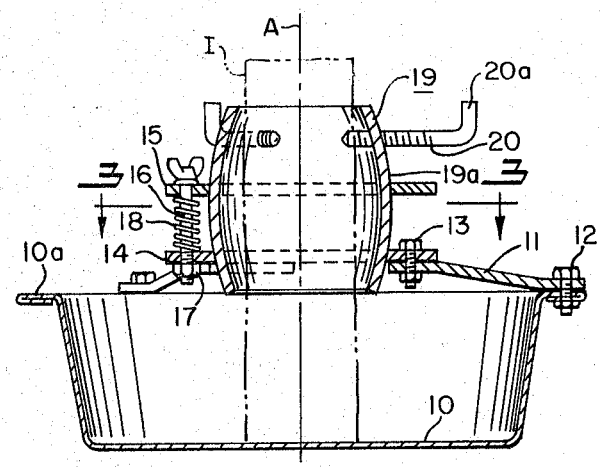
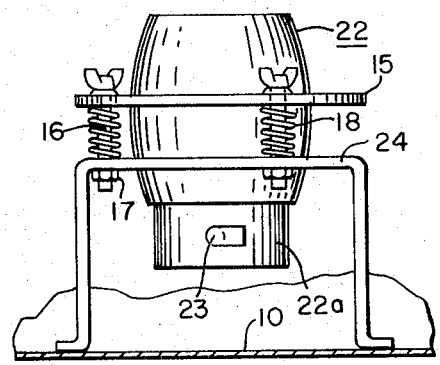
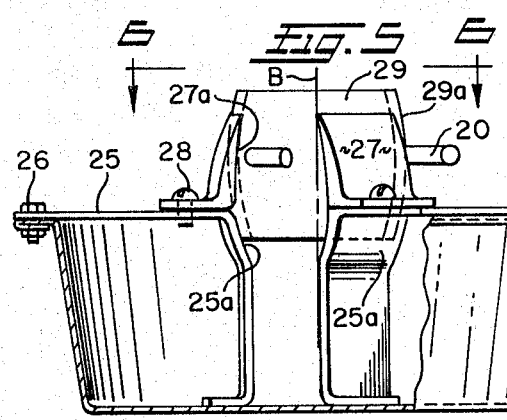
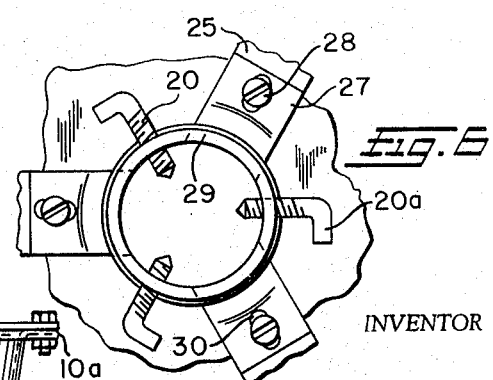
INVENTOR
ALBERT J. TAYLOR
BY
McNenny, Farrington, Pearne & Gordon
ATTORNEYS

United States Patent Office 3,298,642
Patented Jan. 17, 1967

3,298,642
TREE STAND
Albert J. Taylor, 8288 Wilson Mills Road,
Chesterland, Ohio 44026
Filed Apr. 8, 1965, Ser. No. 446,494
6 Claims. (Cl. 248—44)

The present invention relates to a stand and, more particularly, to an improved stand or support for a tree or the like.

As indicated, the present stand may be used to support a tree or other like longitudinally-extending upright members, such as a pole as in the case of a flagpole. For purposes of illustration only, the invention is described in detail in connection with supporting the trunk or bole of a tree.

A number of supports for trees, notably Christmas trees, has been suggested. Such supports are rather complicated in both structure and manner of use. Often, two or more persons are required to hold either the tree or parts of the support in order to mount the tree. Normally, difficulty arises in that the entire assembly of parts, including the tree and all or most all of the disassembled parts of the stand, must be manually held together in a cumbersome manner, while another tightens the parts of the stand until the tree becomes rigidly and integrally a part of the stand or support.

Moreover, after a tree is initially mounted, it frequently becomes apparent that the tree is not vertically centered but lies at a certain angle of inclination from the vertical. It is then necessary to loosen the parts of the stand once more to adjust the tree to a more pleasing vertical position. Again, the difficulty and inconvenience of struggling with the tree and the parts of the stand are repeated.

A single person can easily mount a tree in my stand. It is necessary only to place the butt end of a tree trunk within a receiving sleeve or the like of the present stand and then to tighten fasteners to make the tree and stand an integral structure. Moreover, the present stand can adjustably position the tree in any direction within a vertical, inverted, generally conically shaped area. Such an adjustment to compensate for misalignment or the like is also very easily accomplished with the present invention by a single person and by only slightly loosening certain parts of the stand.

It is therefore a principal object of the present invention to provide an improved stand for a tree, pole, or the like.

Another object is to provide a tree stand or support by which the vertical disposition of a tree may be easily adjusted.

A further object of the invention is to provide a tree stand or support that is simple in construction, economical to manufacture, and simple and efficient to use.

A still further object is to provide a tree stand or support in which attaching means may, if desired, be fixed to a tree while such means is separated from the other parts of the stand.

Other objects and advantages of the invention will be apparent from the following description and drawings wherein:

FIGURE 1 is a plan view of one form of the invention;

FIGURE 2 is an offset section of FIGURE 1 on the line 2—2;

FIGURE 3 is a fragmentary section of FIGURE 2 on the line 3—3;

FIGURE 4 is a fragmentary section similar to FIGURE 2 but showing a modified form of the invention;

FIGURE 5 is a section similar to FIGURE 2 illustrating a further modified form of the invention; and FIGURE 6 is a fragmentary section of FIGURE 5 on the plane of the line 6—6.

In general, all of the illustrated embodiments, which are intended to be only exemplary of the invention for supporting a tree or the like include a base and a support fixed with respect to the base and forming a pocket. The base is preferably a receptacle or vessel adapted to contain a nutrient such as water, aqueous sugar solutions, soil, or the like. A sleeve, adapted to receive the tree, is adjustably positioned within the pocket. Suitable fasteners adjustably secure the sleeve within the pocket at a desired position.

The adjustable positioning of the sleeve permits, in turn, adjustable positioning of a tree with respect to the base, and particularly varying the angle of inclination of the tree from the vertical. In accordance with the present invention, it is possible to secure the sleeve to the tree or the like while separated from the remaining parts of the stand assembly. Subsequently, the tree with the sleeve already secured thereto may then be easily mounted with respect to the base. Alternatively and preferably, the tree may be inserted into the sleeve while it is already in assembly with other parts of the stand, and fasteners may then be tightened to secure the tree with respect to the sleeve and such other parts.

For example, referring to the embodiment of FIGURES 1 through 3, a receptacle or pan 10 adapted to contain a nutrient, has strips or runners 11 secured as by bolt and nut combinations generally indicated at 12 to a flange 10a of the pan. The runners 11 extend inwardly and, on a circular pan as shown, are spaced apart about 120 degrees. The inner ends of the runners 11 are secured, as by bolt and nut combinations indicated at 13, to the lower of two plate members or rings 14 and 15. The rings are held in superposed, spaced-apart relation by a plurality of bolts 16 and nuts 17. A coil spring 18, coaxial with each bolt 16, lies between the rings 14 and 15. As shown especially by FIGURE 2, the central openings of the rings 14 and 15 are substantially vertically aligned to define a receiving-pocket.

This pocket receives a sleeve 19 which, in turn, encircles the trunk or bole of a tree T. As shown in FIGURE 2, the trunk may extend to and seat upon the bottom of the pan 10. Suitable fasteners secure the sleeve 19 to the tree T. In the embodiment shown, the sleeve 19 has threaded openings to receive pointed screws 20. Although here and in other embodiments, the screws 20 are shown as having bent ends 20a for turning the screws, it is understood that slotted screws for use with a screwdriver, or screws with heads of polygonal cross section for use with a wrench may also be used. FIGURE 3 illustrates that, if desired, buttons 21 may be secured to the inner ends of the screws 20 for contacting the tree. This prevents actual penetration by the screws into the tree while spreading the pressure applied to the tree over a larger area.

In accordance with the present invention, the sleeve 19 is adapted to turn about and tilt away from a central vertical axis passing through the receiving-pocket, for example, a vertical axis as shown in FIGURE 2. This is accomplished by suitably mating surfaces of the sleeve 19 with the parts defining the receiving-pocket. Preferably, such surfaces are of matching convex-concave curvature. Although in the illustrated embodiments, the sleeve 19 is shown as having a convexly-curved surface, and the pocket-forming members are shown as having a concavely-curved surface, it is understood that these configurations can be reversed on the indicated parts without departing from the invention.

Thus, in FIGURES 1 through 3, the sleeve 19 is illustrated as having a convexly-curved outer surface 19a which extends substantially in a longitudinal direction. As shown in FIGURE 2, the sleeve 19 seats within the annuli of the rings 14 and 15, with a transverse section of the sleeve of greatest diameter being disposed between the rings. Preferably, the peripheries of the annuli of the ring members are concaved and shaped to lie on a concavely-curved plane substantially matching in reverse curvature the convex shape of the outer surface 19a of the sleeve.

If desired, in the embodiment of FIGURES 1 through 3 the ring 15 can be underslung or placed below the ring 14 which is fixed relatively to the pan 10 by means of the runners 11 and bolt and nut combinations 12. This reversed positioning of the rings may be desirable, for example, when a short tree is being mounted. The grip of the tree stand can then take place nearer the bottom of the pan 10 and simultaneously avoid exposing and positioning ring 15 in an area substantially above the flange 10a of the pan.

FIGURE 4 illustrates a modified embodiment which is similar to that of FIGURES 1 to 3 and therefore the same reference characters have been used to designate identical parts. In this embodiment, the sleeve 22 has an integral, collar extension 22a designed to provide a firmer and/or longer axial grip on a tree. The collar 22a can extend either above or below the sleeve 22 (FIGURE 4) or in both directions. Either the sleeve or the collar (or collars) or both may carry fasteners to engage the tree, but in the embodiment of FIGURE 4, only a collar 22a is illustrated as having a threaded opening to receive a screw 23 which bites into the tree. A U-shaped support 24 replaces the ring 14 of FIGURE 2, the legs of such support 24 extending down to the bottom of the pan 10 where they may be fixed as by spot welding.

FIGURES 5 and 6 illustrate a further embodiment in which the supporting means, secured with respect to the pan 10 and defining the receiving-pocket, includes strips or runners 25 that extend radially inwardly from a flange 10a to which the runners are fixed as by bolt and nut combinations indicated at 26. Near the center of the pan 10, the strips 25 bend at approximately 90 degrees and reach the bottom of the pan where the strips may be secured as by spot welding. There are three strips 25 angularly spaced apart at about 120 degrees as shown in FIGURE 6. Just below the bend, each strip has a concavely-curved portion 25a which cooperates with similarly shaped portions of the other strips to define partially a seat.

Each strip has an L-shaped tension clamp 27. The horizontally extending leg of each clamp is adjustably fixed to its strip 25 as by bolts 28 passing through a slotted opening 29 in the horizontal leg and engaging a threaded opening in the underlying strip 25. The vertically extending legs of the clamp 27 have their facing sides concavely-curved in the direction of their length as indicated at 27a in FIGURE 5. The concavely-curved face 27a of each clamp thereby forms a continuation of the concavely-curved portion 25a of the associated strip 25 and completes the formation of a seat. A sleeve 29 receives a trunk of a tree and has a convexly-curved outer surface 29a extending substantially in a longitudinal axial direction. The sleeve 29 nests among the clamps 27 and within the seat defined as described by the clamps and the concavely-curved portions 25a of the strips. The convexly-shaped outer surface of the sleeve 29a substantially matches the concavely-curved faces 27a of the clamps and the concavely-curved portions 25a of the strip members. The sleeve 29 has threaded openings to receive pointed screws 20 similarly to the embodiment of FIGURES 1 through 3.

In use, either sleeve 19, 22, or 29 can be removed from its attendant component parts of the stand and then slipped around the butt end of a tree trunk. Ring 15 and bolts 16 of the embodiment of FIGURES 1 through 4 may be removed with the sleeve at this time. When a sleeve is suitably located about the tree, the screws 20 or 23 are tightened to fix the sleeve relatively to the tree.

Alternatively, with these sleeves 19, 22, or 29 in place as shown in the drawings, and with the screws 20 or 23 withdrawn or substantially so, the tree may be inserted through the sleeve and allowed to rest upon the bottom of the pan or receptacle 10. Thereafter, the screws 20 or 23 are tightened. This technique of assembly has the advantage of automatically engaging the sleeve at a desired axial position along the tree trunk.

After the tree and sleeve have been placed in the stand as just described, in the case of the embodiments of FIGURES 1 through 4, the bolts 16 are tightened to urge ring 15 toward ring 14 or toward the U-shaped support 24 in the embodiment of FIGURE 4. The springs 18 resiliently oppose this action to urge apart rings 15 and 14 or ring 15 and the U-shaped support 24. In tightening the bolts 16, the peripheries of the annuli of the members 14, 15, or 24 are forced to bear against the outer convexly-curved surface of the sleeve in an axial direction to secure the position of the sleeve relative to the remaining parts of the tree stand.

It will be noted that the rings 14 and 15 of FIGURE 2 (or the corresponding parts 15 and 24 of FIGURE 4) are free to move relatively to each other when the bolts 16 are not tightened. Should the tree upon inspection be inclined somewhat from the vertical or present a less attractive view from an exposed side, the user need only loosen the bolts 16 to permit any one of the disclosed sleeves with its attached tree to pivot or tilt as an integral unit from a vertical axis such as that represented at A in FIGURE 2. Often such degree of movement is possible by loosening only one of the bolts 16. In fact, it is preferred to pre-set two of the three bolts 16, loosening and using the third bolt only for adjusting purposes. After the position of the tree has been adjusted as described, the bolt or bolts 16 are again tightened.

The positioning and tightening of the sleeve 29 of the embodiment of FIGURES 5 and 6 are similar. When the bolts 28 are loosened to free the clamps 27, the sleeve 29 may pivot about and incline from the vertical while in the seat defined by the tension clamps 27 and concavely-curved portions 25a of the runners 25. For example, the sleeve 29 and an attached tree may so pivot and incline from a vertical axis B. By tightening the bolts 28, each clamp 27 is secured to its strip 25 and in bearing relation against the convex surface of the sleeve 29 to fix its position relative to the clamps 27 and strips 25. By virture of the slotted openings 30, the positions of the clamps 27 on their respective strips 25 are adjustable. It is necessary to loosen only one of the tension clamps 27 in order for the sleve 29 and attached tree to turn about or tilt from the axis B in any direction.

It is emphasized that these steps of assembly for any of the embodiments illustrated and described are easily carried out by a single person. While the foregoing decribes several embodiments, it is understood that the invention may be practical in still other forms within the scope of the following claims.

I claim:

1. A support for a tree or the like comprising a receptacle adapted to contain a nutrient, support means fixed with respect to the receptacle including a pair of rings so positioned that their openings are substantially vertically aligned, a sleeve adapted to receive therein a trunk of the tree, fastening means to secure the sleeve to said trunk, said sleeve having a convexly-curved outer surface extending substantially in a longitudinal direction and adapted to seat within the annuli of said rings, with a section of the sleeve of greatest diameter being disposed between the rings, the sleeve being effective to turn about and tilt away from a central vertical axis passing through the substantially vertically aligned opening of the rings, and spring-loaded fastening means connecting the rings to urge them together thereby causing the rings frictionally to engage the outer convexly-curved surface of the sleeve and fix the position of the sleeve relative to the rings.

2. A support for a tree or the like comprising a receptacle adapted to contain a nutrient, support means fixed with respect to the receptacle including generally vertically disposed clamping means having a portion concavely curved in the direction of its length, a sleeve adapted to receive therein a trunk of the tree, fastening means to secure the sleeve to said trunk, said sleeve having a convexly-curved outer surface extending substantially in a longitudinal direction and effective to nest against the concavely-curved portion of the clamping means, whereby the sleeve is normally free to pivot about and incline from the vertical while so nesting, and means to tighten the clamping means to fix the position of the sleeve with respect to the clamping means.

3. A support for a tree or the like comprising a receptacle adapted to contain a nutrient, support means fixed with respect to the receptacle including spaced-apart strip members having a concavely-curved portion cooperating to form partially a seat, a clamp for each strip member, said clamps being generally vertically disposed and having their facing sides concavely-curved in the direction of their lengths, the concavely-curved face of each clamp forming a continuation of the concavely-curved portion of its associated strip member and thereby completing said seat, a sleeve adapted to receive therein a trunk of the tree, fastening means to secure the sleeve to said trunk, said sleeve having a convexly-curved outer surface extending substantially in a longitudinal direction and effective to nest among said clamps and within the defined seat, the convexly-curved outer surface of the sleeve substantially matching the concavely-curved faces of the clamps and the concavely-curved portions of the strip members, whereby the sleeve is normally free to pivot about and incline from the vertical while in said seat, and means adjustably to secure each clamp to its strip member and in bearing relation against the sleeve to fix the position of the sleeve relative to the clamps and strip members.

4. A support for a tree or the like comprising a base, support means fixed with respect to the base including a pair of spaced-apart rings so positioned that their openings are substantially vertically aligned, a sleeve adapted to receive therein a trunk of the tree having a curved outer surface extending substantially in a longitudinal direction and adapted to seat within the spaced rings, said sleeve being effective to turn about and tilt away from a central vertical axis passing through the substantially vertically aligned openings of the rings, and fastening means urging the rings toward one another, thereby to cause the rings frictionally to engage the outer curved surface of the sleeve without contacting each other and fix the position of the sleeve relative to the rings.

5. The support of claim 4 wherein said pair of rings includes superposed, spaced-apart annular members, the peripheries of the annuli of said members being shaped to lie on a curved plane substantially matching that of the outer curved surface of the sleeve, wherein when said fastening means urges the rings toward one another, said shaped peripheries of the annuli of said members bear evenly against the outer curved surface of the sleeve to fix the position of the sleeve relative to the annular members.

6. A support for a tree or the like comprising a base, support means fixed with respect to the base including generally vertically disposed clamping means comprising two superposed portions of which one is movable with respect to the other, each portion being curved in the direction of its length, a sleeve adapted to receive therein a trunk of the tree having a curved outer surface extending substantially in a longitudinal direction and being provided with a curvature substantially matching those of said superposed portions to nest thereagainst, whereby the sleeve is normally free to pivot about and incline away from the vertical while so nesting, and means to secure the movable portion of said clamping means to fix the position of the sleeve with respect thereto.

References Cited by the Examiner

UNITED STATES PATENTS 1,288,461 12/1918 Akeley _____ 248—181
3,052,437 8/1962 Schoen _____ 248—44

FOREIGN PATENTS 8,312 of 1895 Great Britain.

CHANCELLOR E. HARRIS, *Acting Primary Examiner.*

CLAUDE A. LE ROY, *Examiner.*

J. F. FOSS, *Assistant Examiner.*